Aug. 5, 1941.    G. M. SCHANTZ ET AL    2,251,760
WHEEL BEARING SEAL
Filed Feb. 3, 1940    2 Sheets-Sheet 2
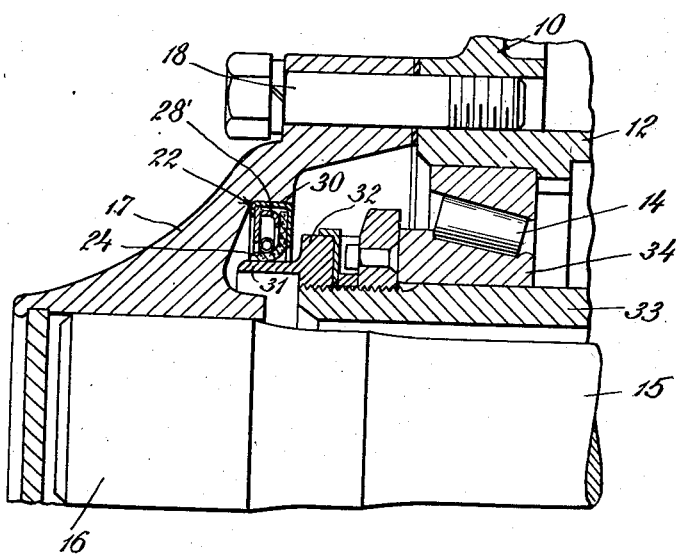
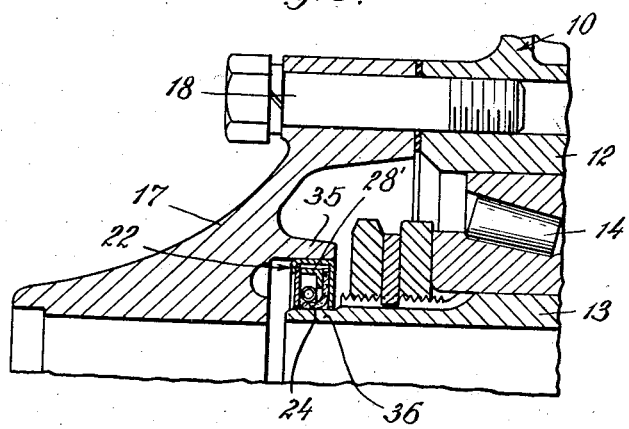
INVENTORS
GORDON M. SCHANTZ
ERIC H. SCHWENN
BY
Hogues Leary & Campbell
ATTORNEYS Patented Aug. 5, 1941

2,251,760

UNITED STATES PATENT OFFICE 2,251,760

WHEEL BEARING SEAL

Gordon M. Schantz and Eric H. Schwenn, Allentown, Pa., assignors to Mack Manufacturing Corporation, Long Island City, N. Y., a corporation of Delaware Application February 3, 1940, Serial No. 317,064

3 Claims. (Cl. 308—36.1)

The present invention relates to seals and embodies, more specifically, an improved form of seal by means of which lubricant on a moving member may be confined effectively to desired locations.

It frequently happens that the escape of lubricant from a predetermined location gives rise to operating difficulties caused by the entry of such lubricant into bearings that are lubricated by a heavier lubricant, with the result that the heavier lubricant is diluted and escapes from its desired location. An illustration of this condition will be found in wheel bearings wherein a wheel is driven by means of a jack shaft received within an axle housing upon which the wheel is journaled. Relatively thin lubricant from the differential and adjacent bearings tends to move outwardly along the drive shaft and escape into the region of the wheel bearing which is packed with a relatively heavy grease.

In accordance with the present invention, it is proposed to provide an improved form of seal by means of which the escape of lubricant along a drive shaft may be prevented.

A further object of the invention is to provide an improved seal for a rear wheel bearing by means of which lubricant from the drive shaft may be prevented from gaining access to the wheel bearing.

A further object of the invention is to provide an improved drive connection between a drive shaft and a wheel journaled on the drive shaft housing, such connection providing a mounting for a seal that prevents the movement of lubricant from the shaft to the wheel bearing. Further objects of the invention will be apparent as it is described in further detail in connection with the accompanying drawings, wherein:

Fig. 2 is a partial view similar to Fig. 1 showing a modified form of the invention.

Fig. 3 is a partial view similar to Fig. 1, showing a further modification of the invention.

Figure 1:
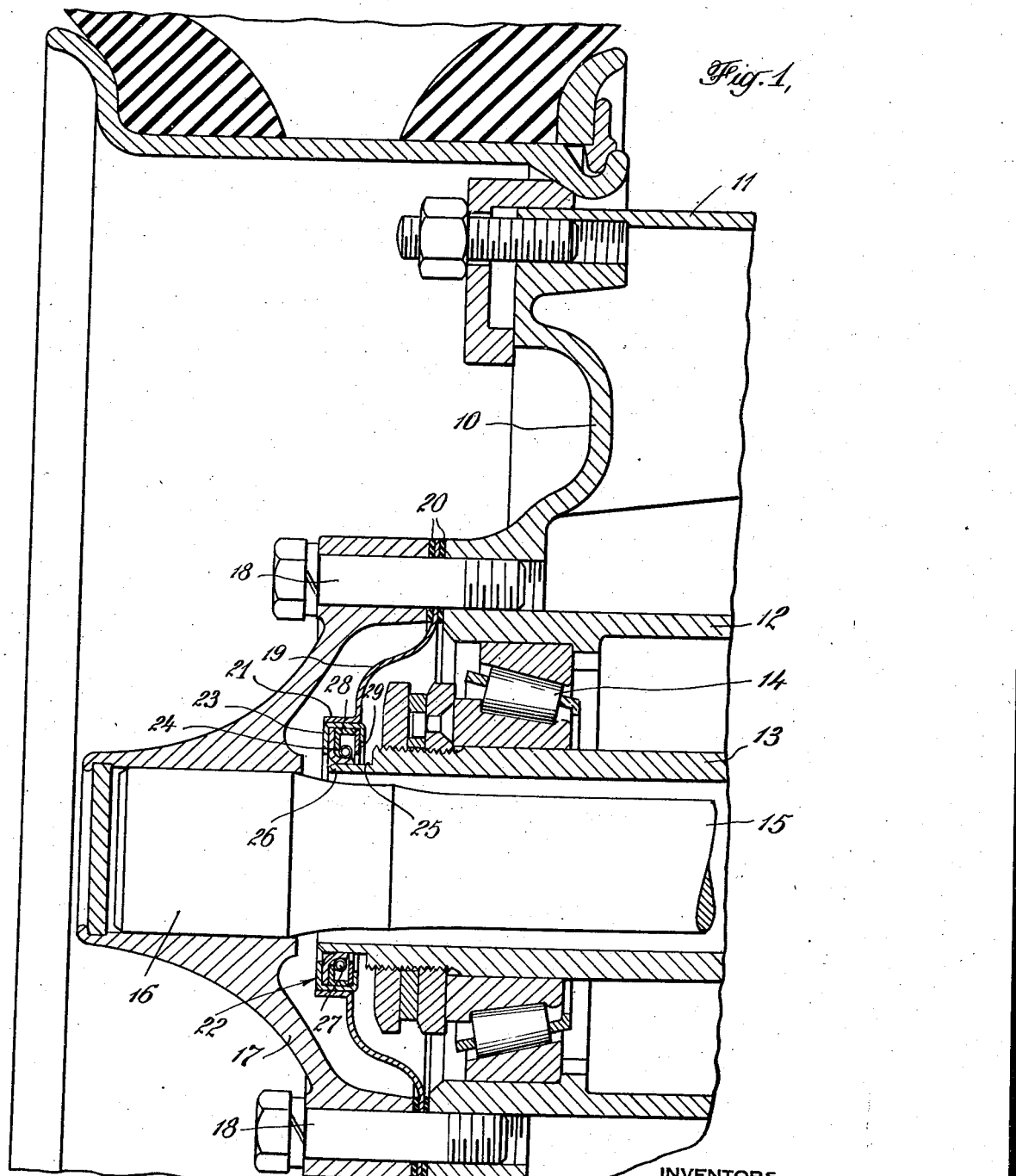
Fig. 1 is a view in section, taken in a plane passing through the axis of the wheel bearing showing a seal constructed in accordance with the present invention.

With reference to the form of the invention shown in Fig. 1, a vehicle wheel is shown at 10 as being provided with a rim 11 and other suitable elements to adapt it for motor vehicle service in accordance with general practice.

This wheel is provided with a hub 12 that is journaled upon an axial housing 13 by means of bearings, one of which is shown at 14. Within the axial housing 13, there is provided a drive shaft 15 having an enlarged section 16 at the end thereof, adapted to be secured to a cap 17. The cap 17 is secured to the hub portion of the wheel 10 by means of bolts 18 in order that the drive may be carried from the axle to the wheel. The foregoing structure is in accordance with common practice.

To prevent lubricant moving along the shaft 15 from reaching the bearing 14, an improved sealing mechanism is provided in accordance with the present invention, this mechanism including a supporting plate 19 which is secured between the cap 17 and the wheel hub 12 by the bolts 18. Gaskets 20 may be provided in order to form a leak-proof connection and the disc 19 may be formed of relatively flexible material if desired. The central portion of the disc 19 is formed with a cylindrical extension 21 within which there is received a seal assembly 22. The seal assembly consists of a ring 23 carried interiorly of the extension 21 and within which is received a leather or other flexible wiper 24 that engages the outer periphery 25 of an extension 26 formed on the housing 13. A spring 27 normally urges the wiper 24 against the surface 25, and locating plates 28 and 29 are provided to maintain the spring in the desired location.

It will be seen that the foregoing structure provides an effective barrier or seal against movement of lubricant from the shaft 15 into the bearing 14. This seal is outside of the bearing 14 and rotates with the wheel against the stationary axial housing. In this location, it is readily accessible for inspection and repair and can easily be assembled when the cap 17 is being secured in position.

A further advantage flowing from the foregoing structure resides in the fact that the concentricity of the bores is more easily maintained near the bearings than at the inner end of the shaft. Deflection under load, moreover, will not cause excessive misalignment of the parts in the region of the seal and the efficiency of the seal is thereby more effectively preserved and its life extended. Since the seal is carried by the removable cap, the structure is easily assembled and, rotating against the axial housing or extension thereof, it is not subject to damage by the splines during the assembly of the mechanism.

In the form of the invention shown in Fig. 2, the cap 17 is provided with an inner cylindrical supporting surface 30 upon which the seal assembly 22 is mounted.

The flexible wiper 24 of this assembly engages the outer surface of a cylindrical extension 31 carried upon a fitting 32 that is secured to the axial housing 33. The fitting 32 may serve as a part of the lock mechanism that secures the inner bearing race 34 of the bearing 14 in position and it will be seen that the advantages of the structure shown in Fig. 1, as hereinabove enumerated, are available in the structures shown in Fig. 2.

In the form of the invention shown in Fig. 3, the cap 17 is provided with an interior cylindrical extension 35 within which is mounted the seal assembly 22. The flexible wiper 24 rides upon a cylindrical extension 36 similar to the extension 26 in the construction shown in Fig. 1. The drive shaft is not shown in Fig. 3 inasmuch as it will be mounted and connected to the cap 17 in a manner similar to that shown in Figs. 1 and 2.

The bearing assembly shown in Fig. 1 differs somewhat from that shown in Figs. 2 and 3. In Fig. 1 the member 28 serves to locate the wiper 24 against the outer flange of the channeled ring 23 and also with the member 29 to locate the spring 27 in position. In the structure shown in Figs. 2 and 3, the corresponding member 28' may assert a yielding continuous pressure against the wiper 24 to maintain it in the positions shown.

While the invention has been described with reference to the specific structure shown in the accompanying drawings, it is not to be limited save as defined in the appended claims.

We claim:

1. In a wheel drive comprising an axle housing, a drive shaft in the housing, a wheel, means including a bearing to journal the wheel on the housing and a cap connecting the drive shaft to the wheel; means to seal the bearing from the interior of said housing comprising a wear member, said housing being provided with an extension presenting a cylindrical surface closely adjacent and surrounding said shaft, means to support said wear member in position to bear radially against said cylindrical surface, and said last named means being mounted for movement with said cap.

2. In a wheel drive comprising an axle housing, a drive shaft in the housing, a wheel, means including a bearing to journal the wheel on the housing and a cap connecting the drive shaft to the wheel; means to seal the bearing from the interior of said housing comprising means providing a cylindrical surface on said housing disposed inwardly thereof adjacent the periphery of said shaft, a wear member adapted to slidably engage said surface, an annular element adapted to be clamped between said cap and said wheel, and means for mounting the wear member for movement with said annular element and in position to bear radially against the cylindrical surface on said housing.

3. In a wheel drive comprising an axle housing, a drive shaft in the housing, a wheel, means including a bearing to journal the wheel on the housing and a cap connecting the drive shaft to the wheel; means to seal the bearing from the interior of said housing comprising means providing a cylindrical surface disposed at the end of said housing, said cap being provided on the inner side thereof with a coaxial shoulder portion, a wear member, and means mounted on said shoulder portion to support the wear member in position to bear radially inward against said cylindrical surface.

GORDON M. SCHANTZ.
ERIC H. SCHWENN.